(12) United States Patent
Dessoly et al.

(10) Patent No.: US 8,881,395 B2
(45) Date of Patent: Nov. 11, 2014

(54) METHOD FOR INCREASING THE COEFFICIENT OF ADHESION BETWEEN TWO PARTS ROTATING AS ONE WITH A ROTOR

(75) Inventors: Vincent Dessoly, Juvisy sur Orge (FR); Claude Marcel Mons, Savigny le Temple (FR); Ana Carmen Viguera Sancho, Alfortville (FR)

(73) Assignee: SNECMA, Paris (FR)

( * ) Notice: Subject to any disclaimer, the term of this patent is extended or adjusted under 35 U.S.C. 154(b) by 711 days.

(21) Appl. No.: 13/055,576

(22) PCT Filed: May 13, 2009

(86) PCT No.: PCT/FR2009/000551
§ 371 (c)(1),
(2), (4) Date: Jan. 24, 2011

(87) PCT Pub. No.: WO2010/010237
PCT Pub. Date: Jan. 28, 2010

(65) Prior Publication Data
US 2011/0116931 A1  May 19, 2011

(30) Foreign Application Priority Data

Jul. 23, 2008 (FR) ...................................... 08 04194

(51) Int. Cl.
*B21K 25/00* (2006.01)
*F16D 1/033* (2006.01)
*F01D 5/06* (2006.01)

(52) U.S. Cl.
CPC ............ *F16D 1/033* (2013.01); *F16D 2300/10* (2013.01); *F05D 2250/60* (2013.01); *F05D 2300/506* (2013.01); *F05D 2230/313* (2013.01); *F01D 5/066* (2013.01); *F05D 2230/90* (2013.01); *F05D 2250/61* (2013.01); *F05D 2300/133* (2013.01); *F05D 2250/611* (2013.01)
USPC .......................... 29/889.2; 29/458; 415/214.1

(58) Field of Classification Search
USPC ........ 415/199.5; 416/198 A, 244 A; 403/337, 403/335; 408/131, 132
See application file for complete search history.

(56) References Cited

U.S. PATENT DOCUMENTS 1,348,667 A * 8/1920 Snyder ........................... 285/328
2,206,223 A * 7/1940 Dearborn ....................... 403/335

(Continued)

FOREIGN PATENT DOCUMENTS

DE      86 25 580       11/1986

OTHER PUBLICATIONS

Iizumi, Masahiko and Kimio, Nishimura, WO2006/061710, Jun. 15, 2006.*

(Continued)

*Primary Examiner* — Edward Look
*Assistant Examiner* — Danielle M Christensen
(74) *Attorney, Agent, or Firm* — Oblon, Spivak, McClelland, Maier & Neustadt, L.L.P.

(57) ABSTRACT

A method for increasing the coefficient of adhesion between two parts that rotate as one with a rotor, for example a turbomachine rotor, those parts pressing against one another via pressing faces. The method includes milling at least one of the pressing faces so as to modify its surface finish and increase its roughness, then covering the or each machined face with a thin layer of a material that is hard and has a high coefficient of friction.

15 Claims, 3 Drawing Sheets

(56) References Cited

U.S. PATENT DOCUMENTS

| | | | | |
|---|---|---|---|---|
| 2,879,092 A | | 3/1959 | Hargrove et al. | |
| 3,321,338 A | * | 5/1967 | Caubet | 148/217 |
| 3,765,795 A | * | 10/1973 | Koff | 416/198 R |
| 4,245,709 A | * | 1/1981 | Manuel | 175/325.5 |
| 4,710,076 A | * | 12/1987 | Boblitt | 409/26 |
| 4,822,204 A | | 4/1989 | Lindenthal et al. | |
| 5,388,963 A | * | 2/1995 | Dimmick et al. | 416/198 A |
| 6,177,174 B1 | * | 1/2001 | Legrand | 428/141 |
| 7,010,917 B2 | * | 3/2006 | Billington | 60/605.1 |

OTHER PUBLICATIONS

Peter Smid, CNC Programming Handbook—A Comprehensive Guide to Practical CNC Prgramming, 2007, Industrial Press, 3rd Edition, pp. 8, 243, 245.*

Fox Valley Technical College, Machine Shop 3: Feed Rate Calculations, Jun. 28, 2001 courtesy of WayBack Machine.*

International Search Report Issued Nov. 19, 2009 in PCT/FRO9/000551 filed May 13, 2009.

* cited by examiner

METHOD FOR INCREASING THE COEFFICIENT OF ADHESION BETWEEN TWO PARTS ROTATING AS ONE WITH A ROTOR

The present invention relates to a method of increasing the coefficient of adhesion between two rotor parts that are constrained together in rotation, e.g. parts of a turbomachine rotor.

A turbomachine rotor generally comprises a plurality of disks, each of the disks having an annular flange that is pressed against an annular flange of an adjacent disk and that is fastened thereto by bolting, i.e. by means of nut-and-bolt fasteners. The bolts are parallel to the axis of rotation of the rotor and they pass through orifices in the flanges, the bolts being regularly distributed around a circumference centered on the axis of the rotor.

In operation, rotary torque is transmitted from one rotor disk to another via the flanges and the bolts, this transmission taking place mainly by shear and by friction. As a result of changing the positions of bearing forces, relative slip movements between the flanges give rise to large excess stresses on the bolts and on the edges of the orifices via which the bolts pass through the flanges, and give rise to a shorter lifetime for the flanges and thus for the rotor.

One solution to this problem consists in increasing the clamping force of the nuts and thus the clamping between the flanges, thereby implying an increase in the diameter and/or the number of bolts for fastening the flanges together. Nevertheless, that solution is not always possible in practice, in particular for reasons of space availability or of compression strength of the disk material, and it is not satisfactory because it gives rise to a significant increase in the weight of the rotor, where an increase in weight is always harmful in aviation, and to an increases in the stresses in the disks (since the orifices through which the fastener bolts pass are closer together and since centrifugal forces are greater).

A particular object of the present invention is to provide a solution to the above-mentioned problem of the prior art that is simple, effective, and inexpensive, by encouraging rotary torque transmission between the flanges to take place by friction rather than by shear, and by limiting relative movements between the flanges.

To this end, the invention provides a method of increasing the coefficient of adhesion between two rotor parts that are constrained together in rotation, in particular two turbomachine parts, the parts bearing one against the other via bearing faces and being fastened to each other by bolting, the method being characterized in that it comprises the steps consisting in machining at least one of the bearing faces by milling so as to modify its surface state and its roughness, and then in coating the or each machined face in a thin layer of a material that is hard and that has a high coefficient of friction.

The method of the invention comprises two essential steps in succession: a step of milling the bearing face of the or each part in order to modify its roughness, and a step of coating the machined face with a protective thin film of a material that is hard and that has a high coefficient of friction.

The method serves to increase the coefficient of adhesion between the two parts in controlled manner. Proposals have already been made to increase the roughness of parts in assemblies of this kind by sand-blasting, generally using corundum or alumina. Nevertheless, such a technique does not enable the final coefficient of adhesion between the parts to be well controlled. The morphology of the bearing faces is a major point for determining the coefficient of friction, and that technique does not enable accurate and reproducible morphologies to be obtained. Furthermore, that sand-blasting is not followed by additional treatment consisting in depositing a hard protective material so as to guarantee that the roughness that is obtained is long-lasting under the compression due to the parts being clamped together and rubbing against each other.

The milling step of the method of the invention is advantageously performed by means of a cutter having a high rate of advance so as to form a particular kind of relief on the bearing face that is constituted by alternating crests and furrows. The thin layer of hard material serves to protect this relief and to avoid it being modified or spoilt by being flattened while the parts are being fastened and clamped together, or by friction in operation. The thin film is of small thickness so as to prevent modifying the surface state that is obtained by milling. The material of the thin film is advantageously a ceramic, and for example titanium nitride. The thin film may be deposited on the machined face by chemical gas or vapor deposition.

Preferably, the bearing faces of the two parts are machined by milling, the crests and the furrows of the bearing faces being formed in opposite directions, so as to be substantially complementary and so as to increase the coefficient of friction between the parts.

By way of example, the bearing faces are annular faces that extend around the axis of rotation of the rotor.

The milling may be performed by effecting one or more passes over one or each bearing face.

By way of example, at least one circumferential pass is effected by moving the cutter over one of the bearing faces about the axis of rotation of the rotor in the clockwise direction. At least one circumferential pass may also be effected by moving the cutter over the other bearing face about the axis of rotation of the rotor in the counterclockwise direction. A plurality of concentric circumferential passes of increasing or decreasing diameter may be effected on the or each face.

In a variant, a plurality of radial passes are effected by moving the cutter over the or each bearing face in directions that are substantially radial relative to the axis of rotation of the rotor, the passes being one beside another so as to machine around all of the face. A plurality of tangential passes may also be effected by moving the cutter over the machined face in directions that are substantially tangential relative to the part.

The milling is performed with a cutter presenting an advance per tooth fz that is determined as a function of the roughness Ra desired for the or each bearing face and as a function of the radius R of the cutter, using the formula:

$$fz = \sqrt{(18\sqrt{3})} \times \sqrt{(Ra \times R)}$$

The roughness or arithmetic roughness Ra should be understood as being the arithmetic mean of the heights of the crests and the furrows. By way of example, the rate of advance per tooth fz lies in the range 0.01 millimeters per tooth (mm/tooth) to 0.3 mm/tooth, and preferably in the range 0.05 mm/tooth to 0.1 mm/tooth, and by way of example is 0.07 mm/tooth.

In a particular implementation of the method of the invention in which the parts are turbomachine rotor disks, each having an annular flange applied against an annular flange of another disk and fastened thereto by bolting, the method includes the steps consisting in machining at least one of the bearing faces of these flanges and of coating it in a thin layer.

Prior to the step of milling the bearing face of a flange, the method may include a step of performing finishing turning on said flange, and after the step of coating the machined bearing face, it may include an additional step of milling the flange to provide festoons or crenellations in the flange.

For a titanium rotor of a high pressure compressor of a turbomachine, it has been found that increasing the coefficient of friction or the coefficient of adhesion between the flanges of the rotor by a factor of two makes it possible to increase the lifetime of the flanges, and thus of the rotor, by a factor of 1.3 for the same bolt clamping torque, or to reduce the number of bolts by 10%, or indeed to reduce the number of bolts by more than 10% if the bolts in question were overdimensioned.

The present invention also provides a rotor disk, in particular for a turbomachine, having a fastener flange presenting a bearing face, said face including alternating crests and furrows that are coated in a thin layer of hard material having a large coefficient of friction. The depth of the furrows relative to the tops of the crests is of the order of 1 micrometer (μm) to 2 μm, for example.

The invention can be better understood and other details, characteristics, and advantages of the present invention appear more clearly on reading the following description made by way of non-limiting example and with reference to the accompanying drawings, in which.

Figure 1:
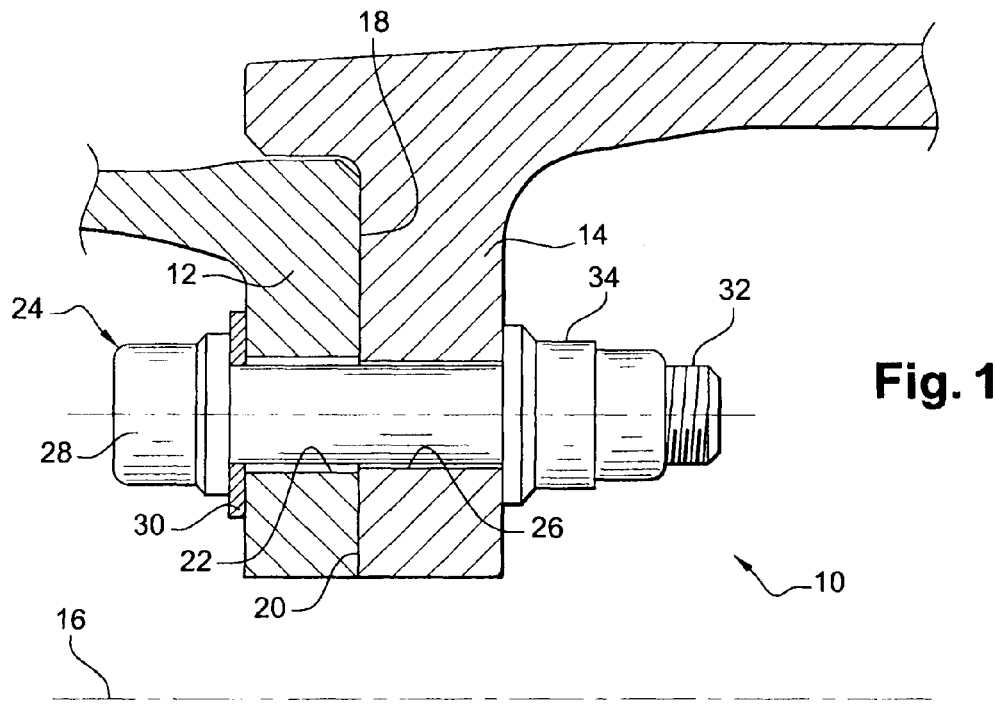
FIG. 1 is a fragmentary diagrammatic view in axial section of a bolted connection between two rotor disks of a turbomachine.

Reference is made initially to FIG. 1 which is an axial section view of a bolted connection 10 between the annular flange 12 of a first rotor disk and the annular flange 14 of a second rotor disk of a turbomachine, the disks being omitted from the drawing for greater clarity. By way of example, the rotor disks are made of an alloy based on nickel and cobalt.

The flanges 12, 14 extend around the axis of rotation 16 of the rotor and they are oriented radially outwards relative to said axis. They are applied one against the other and they are clamped together by nut-and-bolt fasteners.

The flange 12 includes a radial or lateral bearing face 18 for bearing against a corresponding lateral face 20 of the flange 14.

The flange 12 has axial orifices 22 for passing bolts 24 that are regularly distributed around the axis of rotation 16 and that are in axial alignment with orifices 26 in the flange 14. By way of example, the number of bolts 24 lies in the range 20 to 40.

A bolt 24 is engaged axially (from left to right in the drawings) into each orifice 22 in the flange 12 and into the corresponding orifice 26 in the flange 14, until the head 28 of the bolt comes to bear axially against a lateral face of the flange 12 that faces away from the lateral face 18, or against a washer 30 interposed axially between said face and the head of the bolt. Each bolt 24 has a threaded portion 32 receiving a nut 34 for bearing axially against a lateral face of the flange 14 that is opposite from its lateral face 20.

In operation, the rotary vibration and torque are transmitted from one rotor disk to the other by shear and by friction, thereby generating high levels of stress in the bolts 24 and on the edges of the orifices 22, 26 through which said bolts pass.

The present invention provides a method of treating the bearing faces 18 and 20 of the flanges 12 and 14 serving to increase the grip or friction coefficients between the flanges, and thus to enhance the transmission of rotary vibration and torque between the flanges by friction rather than by shear.

The method of the invention comprises two steps: the first step consists in machining at least one of the bearing faces 18 and 20 of the flanges by milling so as to modify its surface state and its roughness, and the second consists in covering the machined face in a thin layer of hard material having a high coefficient of friction.

Figure 2:
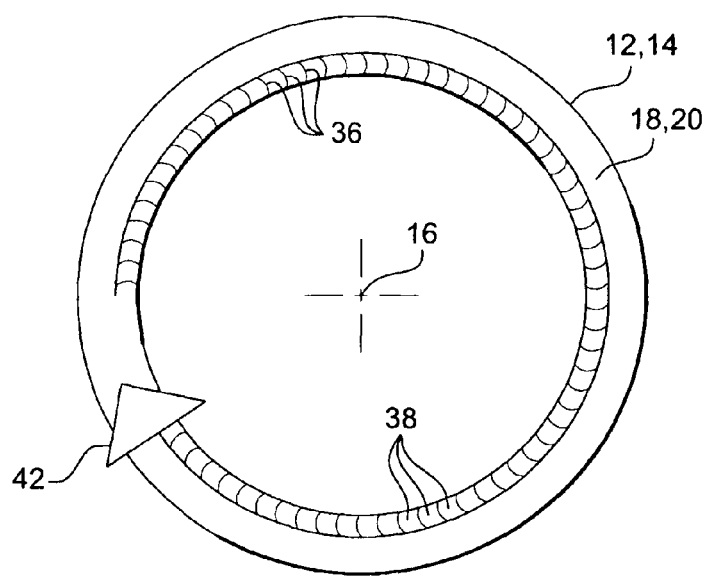
FIG. 2 is a highly diagrammatic view of the bearing face of one of the flanges of FIG. 1, in which the method of the invention has been implemented.
Figure 3:
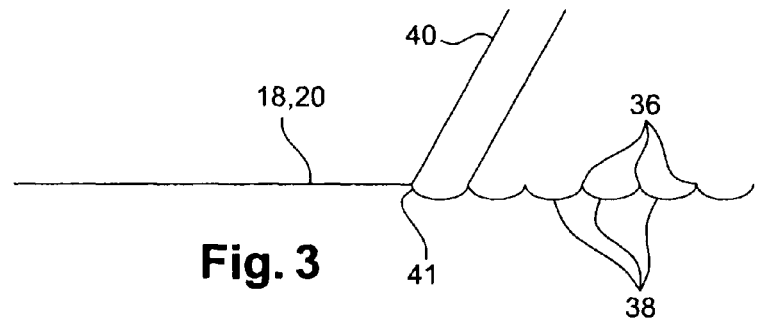
FIG. 3 is a highly diagrammatic representation of a milling step of the method of the invention.

The first step represented diagrammatically in FIGS. 2 and 3 essentially consists in using a high advance rate cutter 40 and in moving the cutter over the bearing face 18, 20 so as to form sawtooth portions in relief thereon, comprising alternating crests 36 and furrows 38.

In the example shown in FIG. 2, the cutter is moved circumferentially over the bearing face 18, 20 in a clockwise direction (arrow 42). In this figure, the cutter 40 is shown passing in the vicinity of the inner periphery of the face 18, 20. A plurality of circumferential passes of increasing diameter are then needed in order to machine all of the bearing face 18, 20, with the number of these passes being a function in particular of the diameter of the cutter and of the radial dimension of the bearing face 18, 20.

The cutter used for this operation may be a single-piece cutter or a cutter for a milling cutter with inserted blades. It may be made of carbide, ceramic, high-speed steel (HSS), and/or cubic boron nitride (CBN), and it may also be covered in any coating.

By way of example, the cutter has a diameter of 16 millimeters (mm), a tip 41 presenting a sharp angle or a rounded edge of radius less than 0.1 mm, a number of teeth that is equal to 4, and a helix angle of about 45°.

By way of example, the utilization parameters of the cutter are as follows when milling the bearing face of a flange made of Inconel 718: cutting speed vc=25 meters per minute (m/min), axial engagement ap=0.3 mm, and advance per tooth fz=0.07 mm.

In general, the advance per tooth of the cutter may be determined using the following formula:

$$fz=\sqrt{(18\sqrt{3})} \times \sqrt{(Ra \times R)}$$

where Ra is the desired arithmetic roughness for the bearing face 18, 20 and R is the end radius of the cutter. By way of example, the arithmetic roughness is 1.6 μm.

When the bearing faces 18, 20 of both flanges 12, 14 are machined by milling, the travel direction of the cutter over a first bearing face 18, 20 is preferably opposite to the travel direction of the cutter over the second bearing face 20, 18 so that the machined portions in relief on those two faces are substantially complementary to one another, thereby improving the coefficient of friction between the surfaces. In the example of FIG. 2, the cutter is moved clockwise over one of the faces and counterclockwise over the other.

Figure 5:
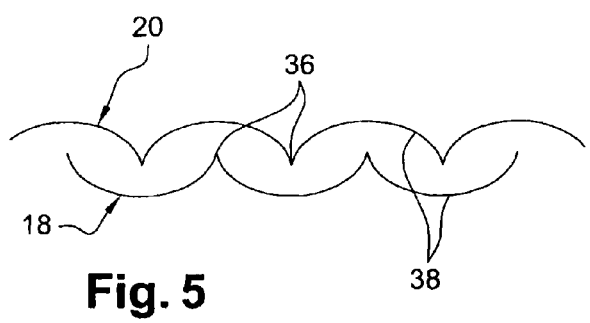
FIGS. 5 and 6 are highly diagrammatic section views of the bearing faces of the FIG. 1 flanges, after said faces have been treated by the method of the invention.
Figure 6:
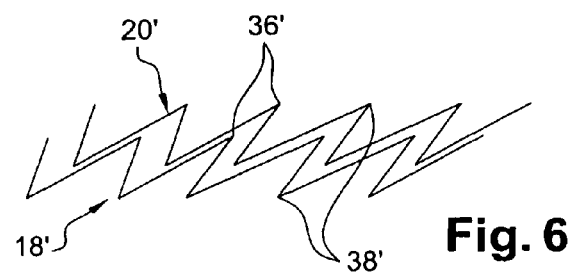

FIGS. 5 and 6 are highly diagrammatic views in section of the bearing faces 18, 20 of the flanges. In both of them, the portions in relief on the bearing faces are configured in such a manner that, when the flanges 12, 14 are clamped together, the crests 36 of a first face engage in the furrows 38 of the second face, and vice versa. In FIG. 6, the peaks 36' of a bearing face 18', 20' are of shapes that are substantially complementary to the furrows 38' of the other bearing face, and vice versa.

Figure 4:
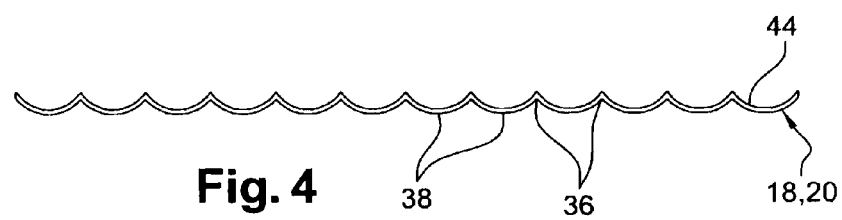
FIG. 4 is a highly diagrammatic representation of a step of depositing a thin layer in the method of the invention.

The second step of the method of the invention is represented diagrammatically in FIG. 4 and consists in depositing a protective thin layer 44 on the machined bearing face 18, 20.

The thin layer 44 covers all of the portions in relief and thus the crests and the furrows of the bearing faces, and it presents small thickness so as to avoid modifying the surface state of the bearing faces as obtained by milling. By way of example, this thickness is of the order of 1 µm to 2 µm, approximately.

The thin film 44 is made of a material that is very hard so as to prevent the portions in relief of the bearing face being flattened when the flanges are clamped together, and so as to limit wear of these portions in relief in operation as a result of friction. This material also presents a high coefficient of friction, in particular against itself.

The thin layer 44 may be deposited by any suitable technique, and for example by physical vapor deposition (PVD) or by internal vapor deposition (IVD).

A thin film may be deposited by a technique of this type onto substrates of various kinds such as substrates made of steel, of an alloy based on nickel or titanium, etc. The deposit serves to conserve the mechanical and adhesion properties of the substrates (disks) since the conditions under which deposition is implemented (and in particular the temperature) are compatible with the heat treatments applied to the alloys constituting the substrates and even with certain prestressed states obtained by mechanical treatment of the substrates (e.g. by cold deformation or shot-blasting).

By way of example, the material deposited as a thin layer is a stoichiometric coating of titanium nitride. Deposition may be implemented at temperatures of the order of 300° C. to 400° C., which are compatible with the heat treatments applied to the above-mentioned alloys and below the thresholds for relaxing prestress.

The hardness of titanium nitride is greater than 1000 HV (Vickers hardness). It presents excellent adhesion and a high coefficient of friction against itself. Because of the nature of the material (ceramic), these properties are stable throughout the temperature range of rotor disks for a turbomachine (up to 750° C. and beyond). The coefficient of friction thus goes from the range 0.3-0.6 for metal-on-metal contact to a coefficient of about 0.9.

Figure 7:
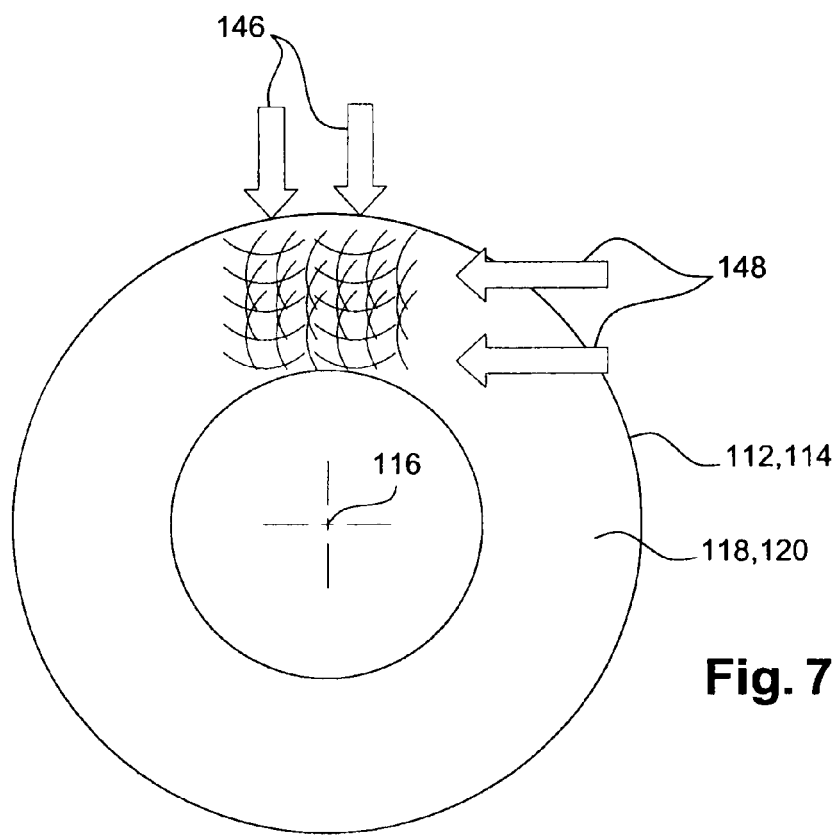
FIG. 7 is a highly diagrammatic view of the bearing face of a flange in which a variant of the method of the invention has been implemented.
Figure 8:
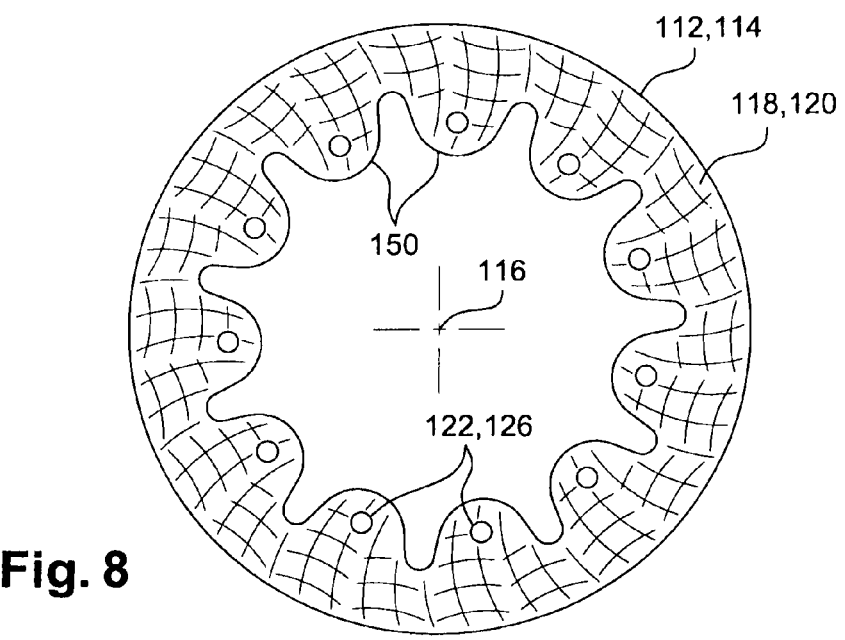
FIG. 8 is a highly diagrammatic view of the bearing face of the FIG. 7 flange at the end of the method of the invention.

Reference is made below to FIGS. 7 and 8 which represent a variant implementation of the method of the invention.

References 118, 120 designate the bearing faces of the two flanges 112, 114 of the rotor disk, the flanges 112, 114 presenting radial dimensions that are greater than the radial dimensions of the flanges in FIG. 2.

The method differs from that described above in that the milling of the or each bearing face is performed by moving the cutter in directions that are radial and tangential, instead of circumferential.

A plurality of mutually adjacent radial passes are performed by moving the cutter radially upwards or downwards (arrows 146) over an entire circumference of the or each bearing face 18, 20. The number of these passes depends in particular on the diameter of the flange and on the diameter of the cutter. A plurality of tangential passes (arrows 148) are then performed over the entire outline of the bearing face so as to form crests and furrows perpendicularly to the crests and furrows formed by the radial passes. This produces a grid of passes forming an array of peaks of material on the bearing face, these peaks of material corresponding to the intersections between the crests formed by the radial passes and the crests formed by the tangential passes.

In a particular implementation of the method of the invention, the two above-mentioned passes are preceded by a step that consists in effecting semi-finishing machining of the flanges by turning. These steps are then followed by another step of milling the flanges so as to form a festooned or crenellated edge at its inner periphery. The festoons 150 or crenellations extend radially inwards and are regularly distributed around the axis of rotation 116 of the rotor. Orifices 122, 126 for passing flange fastener bolts may then be drilled in the festoons 150.

The above-mentioned operations of milling and depositing a thin layer in the method of the invention may be preceded or followed by a step of applying mechanical treatment (e.g. by cold deformation or by shot blasting), and/or of heat treatment (e.g. by expansion or tempering) of the parts, and in particular of the orifices and the festoons of the flanges, in order to improve the lifetimes of said parts. The temperatures and the deposition conditions for the hard material should be selected so as to take account of the mechanical and/or heat treatments of the material constituting the parts for treatment. Account may also be taken of the prestressed state if the treatment is implemented prior to deposition. If these steps are performed after the hard material has been deposited, the zones coated in the hard material should be protected, e.g. by means of masks.

The invention claimed is:

1. A method of increasing the coefficient of adhesion between two rotor parts that are constrained together in rotation, or two turbomachine parts, the parts bearing one against the other via bearing faces and being fastened to each other by bolting, the method comprising:

machining at least one of the bearing faces by milling so as to modify a surface state and roughness of the at least one bearing face; and then coating each machined face in a thin layer of a material that is hard and that has a high coefficient of friction, said thin layer having a thickness determined so as to prevent modifying the surface state that is obtained by milling, wherein the milling is performed with a cutter presenting an advance per tooth fz that is determined as a function of the roughness Ra desired for the or each bearing face and as a function of the radius R of the cutter, using the formula:

$$fz = \sqrt{(18\sqrt{3})} \times \sqrt{(Ra \times R)}.$$

2. The method according to claim 1, wherein the bearing face is machined to form alternating crests and furrows in the bearing face.

3. The method according to claim 2, wherein the bearing faces of the two parts are machined by milling, the crests and the furrows of the bearing faces being formed in opposite directions.

4. The method according to claim 1, wherein the bearing faces are annular and extend around the axis of rotation of the rotor.

5. The method according to claim 1, wherein the milling is performed by effecting one or more passes over the bearing face.

6. The method according to claim 5, wherein the bearing faces are annular and extend around the axis of rotation of the rotor, and wherein at least one circumferential pass is affected by moving the cutter over one of the bearing faces about the axis of rotation of the rotor in the clockwise direction.

7. The method according to claim 6, wherein at least one circumferential pass is effected by moving the cutter over the other bearing face about the axis of rotation of the rotor in the counterclockwise direction.

8. The method according to claim 6, wherein a plurality of concentric circumferential passes of increasing or decreasing diameter are effected on the or each bearing face.

9. The method according to claim 5, wherein the bearing faces are annular and extend around the axis of rotation of the rotor, and wherein a plurality of radial passes are effected by moving the cutter over the or each bearing face in directions that are substantially radial relative to the axis of rotation of the rotor, the passes being one beside another so as to machine around all of the bearing face.

10. The method according to claim 9, wherein a plurality of tangential passes are effected by moving the cutter over the or each machined face in directions that are substantially tangential relative to the part.

11. The method according to claim 1, wherein the bearing face is covered in a thin layer of a ceramic material.

12. The method according to claim 1, wherein the milling and depositing the thin film are preceded or followed by treating the parts mechanically.

13. The method according to claim 12, wherein the parts are mechanically treated by cold deformation or shot blasting, by heat-treating the parts, and/or by expansion or tempering.

14. A method of increasing the coefficient of adhesion between two rotor parts that are constrained together in rotation, or two turbomachine parts, the parts bearing one against the other via bearing faces and being fastened to each other by bolting, the method comprising:
  machining at least one of the bearing faces by milling so as to modify a surface state and roughness of the at least one bearing face; and then
  coating each machined face in a thin layer of a material that is hard and that has a high coefficient of friction, said thin layer having a thickness determined so as to prevent modifying the surface state that is obtained by milling, wherein for parts constituted by rotor disks of a turbomachine each having an annular flange applied against an annular flange of the other disk and fastened thereto by bolting, the method further comprising machining at least one of the bearing faces of the flanges and coating it in a thin layer.

15. The method according to claim 14, further comprising, prior to the milling the bearing face of a flange, performing finishing turning on the flange, and after the coating the machined bearing face, further comprising milling the flange to provide festoons or crenellations in the flange.

* * * * *

UNITED STATES PATENT AND TRADEMARK OFFICE
CERTIFICATE OF CORRECTION

PATENT NO. : 8,881,395 B2
APPLICATION NO. : 13/055576
DATED : November 11, 2014
INVENTOR(S) : Vincent Dessoly et al.

It is certified that error appears in the above-identified patent and that said Letters Patent is hereby corrected as shown below:

In the claims

In column 6, line 62, Claim 6, "moving the cutter over" should read -- moving a cutter over --

In column 6, line 65, Claim 7, moving the cutter over" should read -- moving a cutter over --

In column 7, line 7, Claim 9, "moving the cutter over" should read -- moving a cutter over --

In column 7, line 12, Claim 10, "moving the cutter over" should read -- moving a cutter over --

In column 7, line 18, Claim 12, " depositing the thin film" should read -- depositing the thin layer --

Signed and Sealed this
Fifth Day of May, 2015

Michelle K. Lee
*Director of the United States Patent and Trademark Office*